United States Patent

Baker

[15] 3,641,909
[45] Feb. 15, 1972

[54] SYSTEM FOR RUPTURING A POD CONTAINING PROCESSING FLUID FOR PHOTOGRAPHIC APPARATUS

[72] Inventor: Philip G. Baker, Peabody, Mass.
[73] Assignee: Polaroid Corporation, Cambridge, Mass.
[22] Filed: July 3, 1969
[21] Appl. No.: 838,793

[52] U.S. Cl. ...............................95/89 R, 95/13, 352/78, 352/130
[51] Int. Cl. ......................................G03d 5/02
[58] Field of Search .................95/13 R, 89 R, 90.5; 352/72, 352/74, 78, 130

[56] References Cited

UNITED STATES PATENTS

| | | | |
|---|---|---|---|
| 2,449,626 | 9/1948 | Suthann | 352/74 |
| 3,260,186 | 7/1966 | Lowell | 95/90.5 |
| 3,383,998 | 5/1968 | Takats | 95/90.5 |
| 3,483,809 | 12/1969 | Schmidt et al. | 95/89 X |

Primary Examiner—Samuel S. Matthews
Assistant Examiner—Fred L. Braun
Attorney—Brown and Mikulka, William D. Roberson and Robert L. Berger

[57] ABSTRACT

A system for rupturing a pod, having a weakened edge portion and containing processing fluid for photographic material, and for expelling the fluid therefrom. The fluid-filled pod is mounted adjacent a support surface which typically forms part of a motion picture film-handling cassette. Such cassette includes a mechanism for advancing the filmstrip within the cassette into operable relationship with an applicator that communicates with the weakened portion of the pod. The cassette is inserted into processing apparatus against the force of a spring and is releasably locked therein by a latch of that apparatus adapted to seat in a recess of the cassette. In one embodiment the force-applying member is connected to a removable cover plate which forms part of the cassette and which is slidably disposed over the pod. The force-applying member of another embodiment comprises a relatively narrow strip of rigid material slidably mounted on the cassette for displacement across the pod. In a third embodiment the pod-rupturing member comprises a removable cover plate forming part of the cassette and mounted over the pod for displacement against the pod under the force of a roller mounted within the processor. In still another embodiment the pod-rupturing device consists of a roller slidably mounted between a pair of canted guide tracks. In a fifth embodiment the pod-rupturing element comprises a blade pivotably mounted within the processor.

35 Claims, 15 Drawing Figures

INVENTOR.
PHILIP G. BAKER

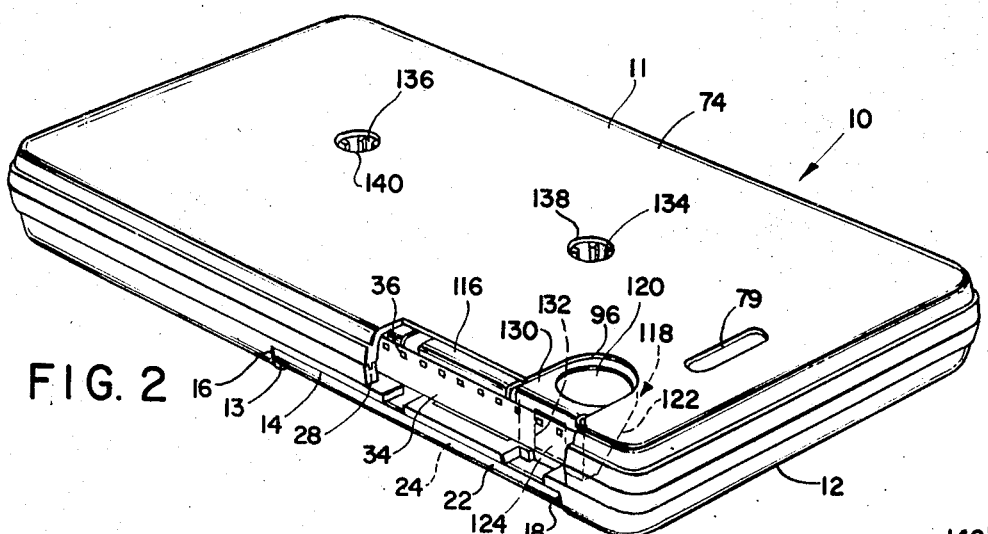

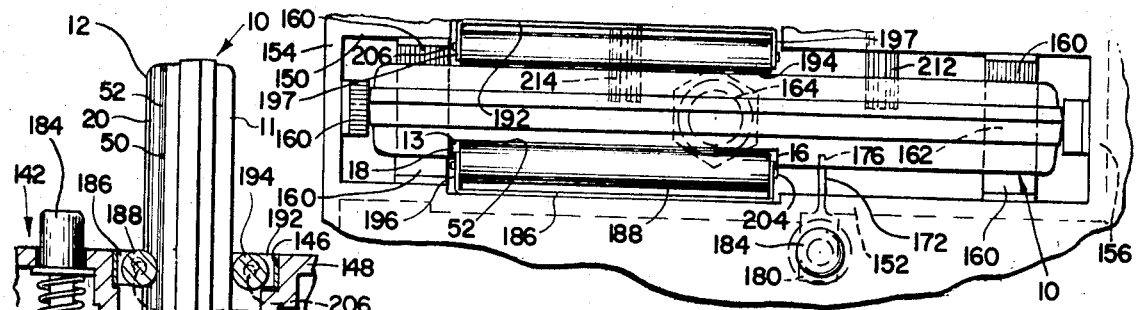
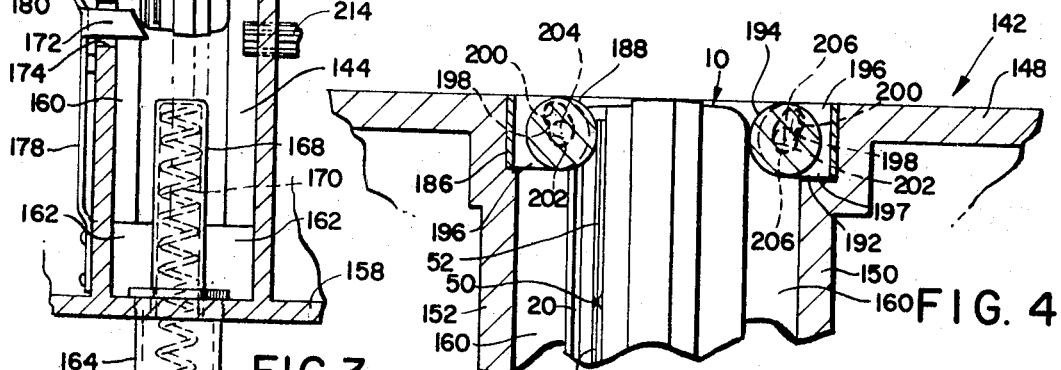
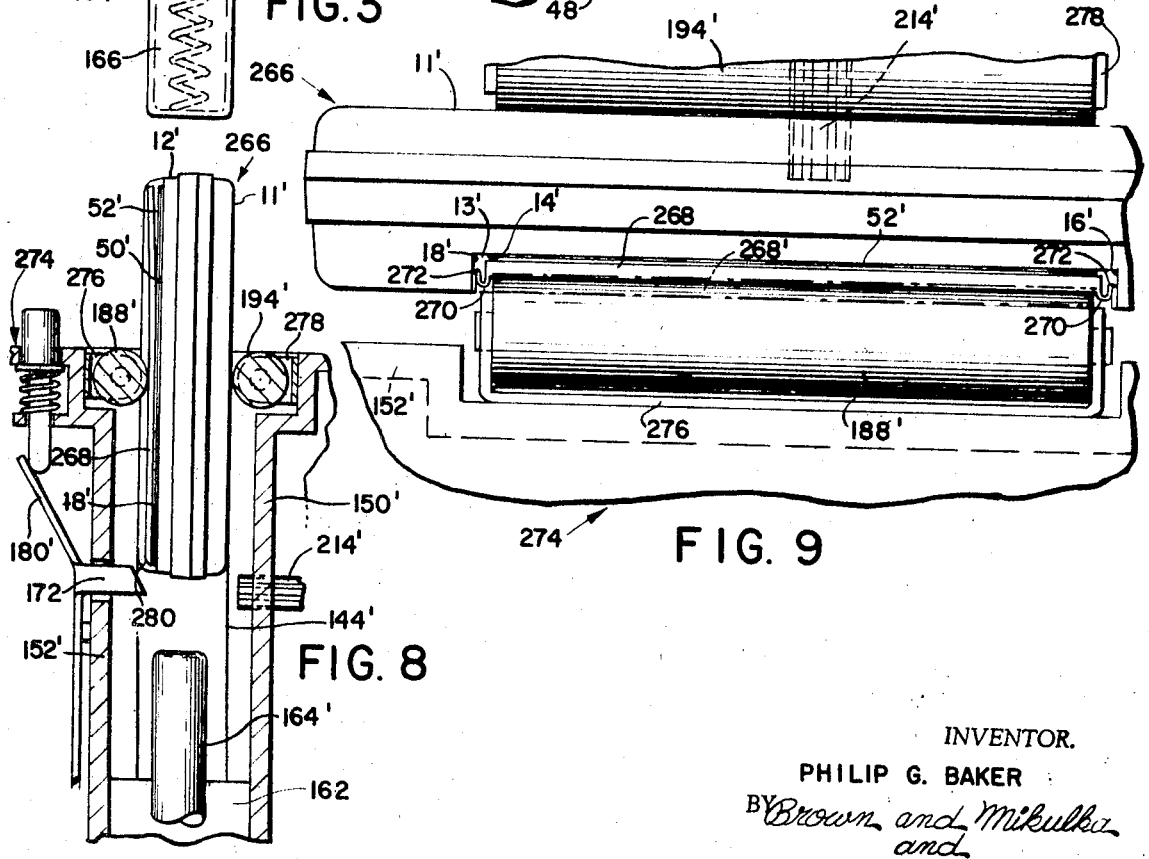

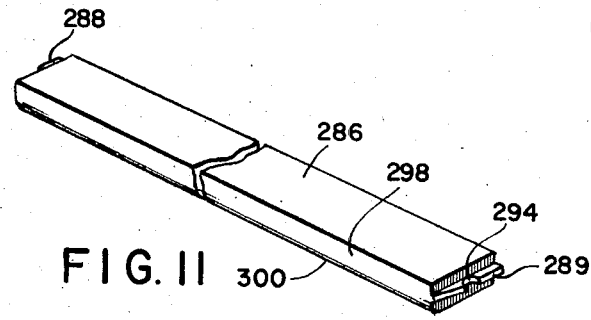
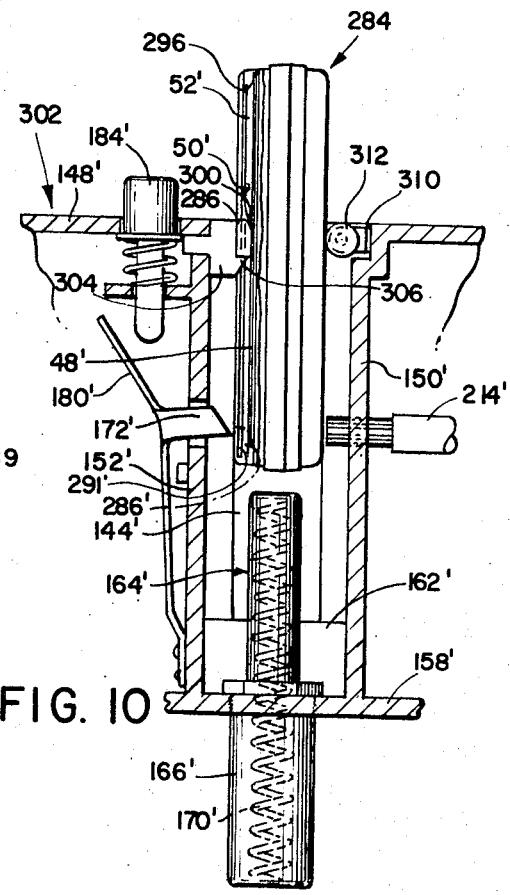
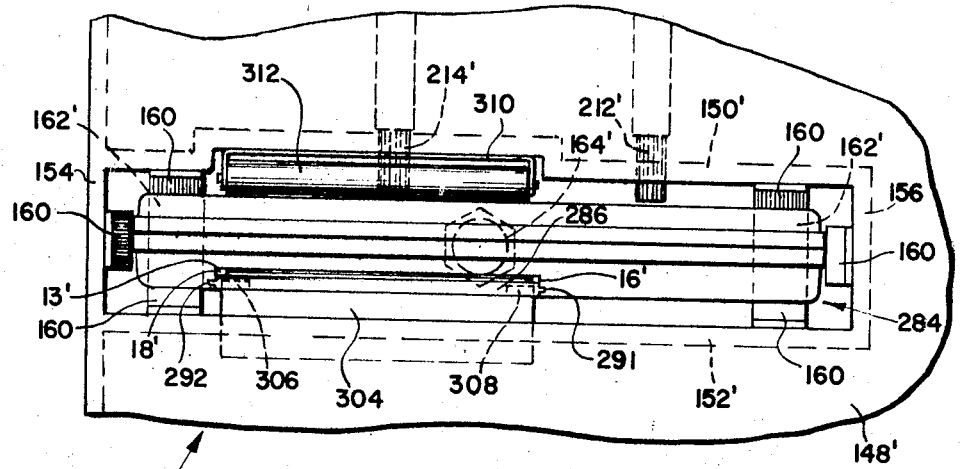
INVENTOR.
PHILIP G. BAKER
BY Brown and Mikulka
and
Robert L. Berger
ATTORNEYS

INVENTOR.
PHILIP G. BAKER 3,641,909

SYSTEM FOR RUPTURING A POD CONTAINING PROCESSING FLUID FOR PHOTOGRAPHIC APPARATUS

BACKGROUND OF THE INVENTION

1. Field of Invention

This invention relates to photography and, more particularly, to an improved system for releasably receiving a photographic cassette and for rupturing a pod mounted therein containing processing fluid for photographic material.

2. Description of the Prior Art

After motion picture film has been exposed in a camera, it has generally been the practice for the photographer to send the container of exposed film to a processing laboratory. At the laboratory the film is removed from the container and subjected to a series of operations in order to produce visible images from the images recorded thereon during the exposure operations. The fully developed filmstrip is then rewound onto a reel at the laboratory and returned to the user.

The extended delay normally incurred between the time exposed film is sent to the laboratory and returned ready for viewing has proved to be a significant inconvenience to the user and a source of great annoyance.

The field of still photography is no longer hampered by extensive periods of delay associated with the processing of exposed film. The impact on the public of the one-step photographic process employing diffusion transfer techniques is a matter of record and generally well known. The home still photographer can now enjoy the fruits of his efforts in a matter of seconds. This important convenience has been available to the amateur still photographer for many years.

Most recently, important technological advances have made it possible for the home photographer interested in motion pictures to enjoy this same convenience. Radically different systems have now been developed which permit the photographer himself to quickly and easily process and project a strip of motion picture film shortly after the pictures have been taken. Exemplary of such new and unique systems are those described in U.S. Pat. No. 3,537,784 of Rogers B. Downey which issued on Nov. 3, 1970, application Ser. No. 767,609 filed in the name of Herbert A. Bing on Oct. 15, 1968, now abandoned, and in the following copending applications:

| Serial No. | Inventor(s) | Filing Date |
| --- | --- | --- |
| 755,901 | Edwin H. Land | Aug. 28, 1968 |
| 761,771 | Rogers B. Downey | Sept. 23, 1968 |
| 772,789 | Vaito K. Eloranta et al. | Nov. 1, 1968 |
| 788,897 | Rogers B. Downey | Jan. 3, 1969 |
| 813,427 | Rogers B. Downey | Apr. 4, 1969 |
| 813,469 | Rogers B. Downey | Apr. 4, 1969 |
| 813,586 | Rogers B. Downey et al. | Apr. 4, 1969 |
| 838,822 | Rogers B. Downey et al. | July 3, 1969 |
| 838,783 | Rogers B. Downey et al. | July 3, 1969 |
| 838,832 | Rogers B. Downey et al. | July 3, 1969 |
| 838,794 | Rogers B. Downey | July 3, 1969 |

The above-mentioned patent, abandoned application, and copending applications are assigned to the assignee of the present invention. Most of the systems described in the aforementioned copending applications advantageously employ a cassette from which the film need not be removed during exposure, processing and projection operations.

In commercial and industrial operations, such rapid motion picture processing systems are not only an improvement as a matter of convenience, but have other important effects as well. For instance, motion picture newsreel programs can be presented on television to the viewing public shortly after events of interest have occurred and been photographed.

In some of these new systems the processing fluid is initially stored in a dispensing container having an applicator, in some the processing fluid is initially stored in a frangible container from which it is later released into a reservoir of the cassette to facilitate the processing operation, while in still others the processing fluid is initially stored in a rupturable pod from which it can be expelled into an applicator at the proper time. Considerable funds and effort are currently being expended to further improve an refine various features of these systems in order to reduce their cost, to further simplify the task of the operator, to improve their reliability, and to improve the quality of the final product. The present invention is directed to an improved system for rupturing a processing fluid containing pod and for expelling the fluid therefrom. In the illustrated preferred embodiments, the pod is mounted in a motion picture film handling cassette and the overall system includes improved apparatus for receiving the cassette, for initiating the rupturing of the pod mounted therein and for subsequently ejecting the cassette. Preferably, the system of this invention is adapted to facilitate the combined functions of processing and projecting the strip of motion picture film housed in the cassette, the overall system being adapted for operation by the photographer himself.

One of the objects of this invention, therefore, is to provide an improved system for rupturing a fluid-containing pod.

Another primary object of this invention is to provide an improved system for receiving a motion picture film-handling cassette containing a rupturable pod of processing fluid, and for automatically rupturing that pod and expelling the fluid therefrom in the process of receiving such cassette.

An additional object of this invention is to provide an improved system for receiving a film-handling cassette, for locking that cassette into position within the receiving means and for selectively ejecting the cassette from the receiving means.

A further object of this invention is to provide an improved system for incorporating a rupturable processing fluid containing pod into a film-handling cassette.

Still another object of this invention is to provide an improved film-handling cassette incorporating a rupturable processing fluid containing pod and means for selectively rupturing that pod.

Also, an object of this invention is to provide an improved system for protecting a rupturable fluid-containing pod from premature accidental rupture.

Additionally, an object of this invention is to provide improved apparatus for receiving cassettes of the type indicated and for facilitating the application of the processing fluid to the strip of photographic material housed therein.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the illustrated preferred embodiments when read in connection with the accompanying drawings wherein like numbers have been employed in the different figures to denote the same parts and wherein:

FIG. 2 is a diagrammatic perspective view of the cassette illustrated in FIG. 1;

FIG. 3 is a fragmentary diagrammatic vertical sectional view of an apparatus embodying certain features of the present invention and illustrating the cassette shown in FIGS. 1 and 2 partially inserted into the cassette-receiving means of that apparatus;

FIG. 4 is an enlarged view of a section of the apparatus illustrated in FIG. 3 showing the cassette fully inserted into its cassette-receiving means;

FIG. 5 is a partial plan view of the apparatus of the apparatus illustrated in FIGS. 3 and 4 at the time the cassette is fully inserted into its cassette-receiving means;

FIG. 6 is a fragmentary diagrammatic vertical sectional view of another embodiment of the present invention illustrating the cassette shown in FIGS. 1 and 2 partially inserted into its cassette-receiving means;

FIG. 7 is a partial plan view of the embodiment of this invention illustrated in FIG. 6 showing the cassette fully inserted into its cassette-receiving means;

FIG. 8 is a fragmentary diagrammatic vertical sectional view of a third embodiment of the present invention illustrating a cassette partially inserted into the cassette-receiving means of a processor-projector unit;

FIG. 9 is a partial plan view of the embodiment of this invention illustrated in FIG. 8 showing the cassette fully inserted into the cassette-receiving means of the processor-projector unit;

FIG. 10 is a fragmentary diagrammatic vertical sectional view of a fourth embodiment of the present invention showing a cassette partially inserted into a processor-projector unit;

FIG. 11 is a diagrammatic perspective view of the force-applying member forming part of the cassette in the embodiment of this invention illustrated in FIG. 10;

FIG. 12 is a partial plan view of the embodiment of this invention illustrated in FIG. 10 showing the cassette fully inserted into the processor-projector unit;

SUMMARY OF THE INVENTION

Figure 1:
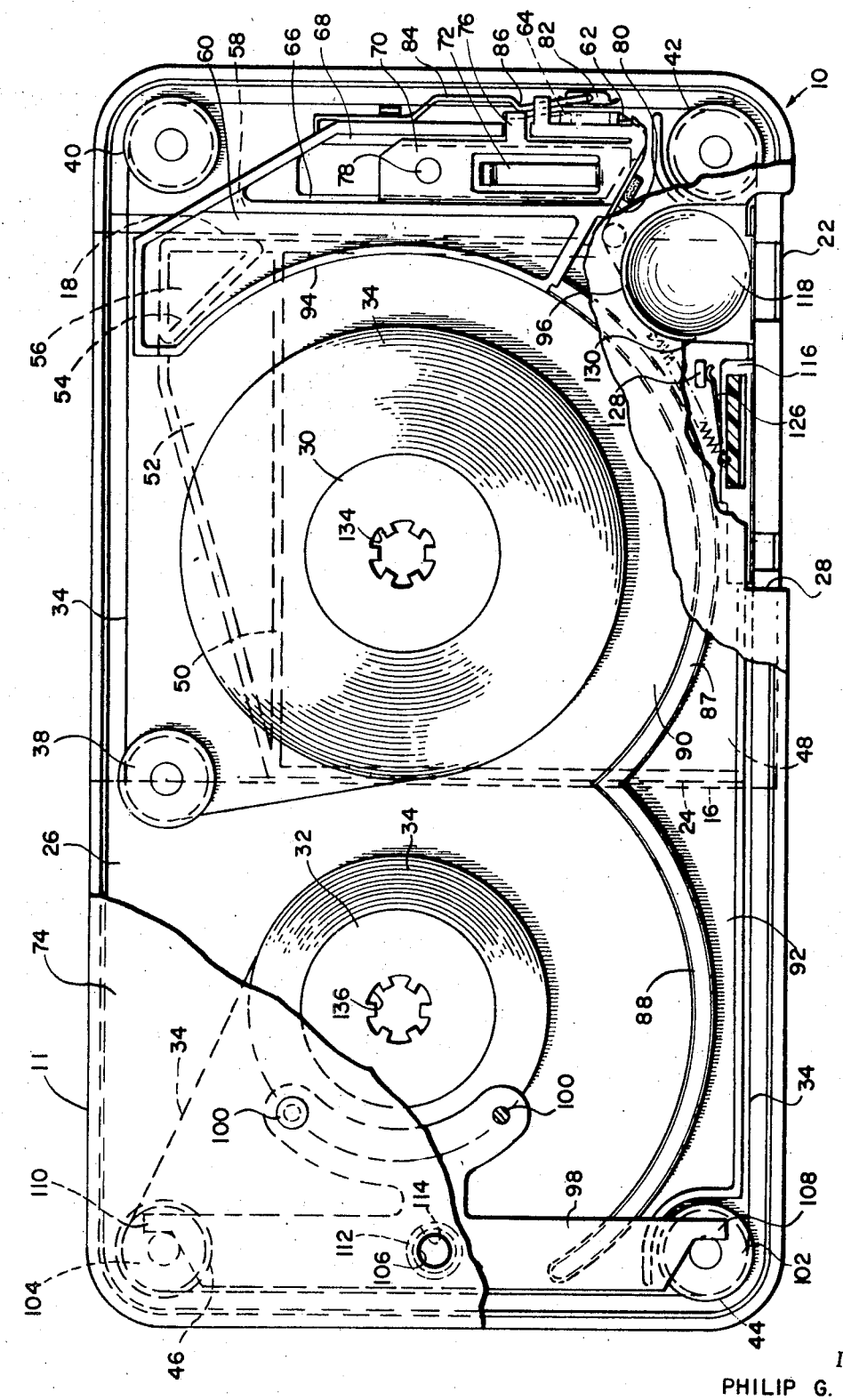
FIG. 1 is a diagrammatic cutaway plan view of a compact multipurpose motion picture film-handling cassette of a type with which certain embodiments of the present invention are adapted to be employed.

This invention facilitates the application of a fluid coating to a strip of photographic material. More specifically, this invention effects the rupturing of a pod containing processing fluid and having a weakened portion adapted to rupture and causes the fluid to be fed therefrom to an applicator across which the filmstrip is progressively advanced. In its illustrated preferred embodiments, the invention involves the use of a compact multipurpose film-handling cassette in which the rupturable pod is mounted and in which the strip of photographic material may be transported for first processing operations and then projection operations. In addition to the rupturable pod, each such cassette houses an applicator in communication with the rupturable pod and means adapted to be driven by externally mounted drive means to progressively advance the filmstrip within the cassette across the applicator.

The processing unit, which as indicated, may also serve as a projector, includes a receiving chamber into which the cassette may be inserted against the force of an ejection spring. When fully inserted into the receiving chamber, the cassette is releasably locked therein by a latch of the processing unit which automatically seats in a recess of the cassette. The force of the aforementioned spring ejects the cassette from the processing unit whenever the latch is disengaged from the cassette's recess. The processing unit also includes means for engaging and selectively driving the film-advancing means of the cassette once the cassette has been inserted into that unit. Most importantly, the processing unit includes means for effecting the rupture of the cassette's pod and for expelling the processing fluid therefrom.

In one embodiment of this invention, a force-applying member is mounted on a cover plate slidably disposed over the cassette's rupturable pod. As the cassette is partially inserted into the receiving means of the processing unit, an element of that unit engages the cover plate so as to preclude further entrance of the cover plate into the processing unit. Subsequent movement of the cassette into the processing unit causes the cassette's pod to be progressively displaced across the force-applying member connected to the cover plate.

In another embodiment, a force-applying member in the form of a relatively narrow strip of rigid material is slidably mounted to the cassette for movement across and in contact with the cassette's rupturable pod. As the cassette is partially inserted into the processing unit, its aforementioned force-applying member is engaged by a fixedly mounted element of that unit. Further displacement of the cassette inwardly of the processing unit causes its rupturable pod to be progressively drawn across its force-applying member.

One embodiment of this invention employs a cover plate overlying the cassette's rupturable pod and releasably fastened to the cassette's housing. The connection between the cover plate and the cassette's housing is such as to permit inward displacement of the cover plate against the pod responsive to an externally mounted force-applying member being pressed against the outside face of the cover plate. The cassette is inserted into the processing unit between a pair of fixedly positioned rollers, one of which exerts a force against the cassette's cover plate to effect a rupturing of the fluid-containing pod. When the cassette is subsequently ejected from the processing unit, its cover plate may be removed so that there will be no contact between the pod-rupturing roller of the processing unit and the cassette in the course of later insertions of the cassette into that unit.

In still another embodiment of this invention a cover plate overlying the fluid-filled pod is adapted to be removed prior to inserting the cassette into the processing unit. As the cassette is then inserted into the processing unit, its pod is ruptured by a roller of that unit. That roller is slidably mounted in a pair of guide tracks canted downwardly within the processing unit and inwardly of that unit's cassette-receiving chamber. Thus, this roller applies a substantial amount of force to the pod as the cassette is inserted into the processing unit, but very little force against the pod as the cassette is ejected from that unit.

In still another illustrated embodiment of this invention, the cassette is similar to that in the last-mentioned embodiment in that its rupturable pod is completely exposed prior to inserting the cassette into the processing unit. In this case the processing unit includes a pivotably mounted blade which may be displaced from a first position, wherein it is adapted to contact and effect a rupturing of the pod as the cassette is inserted into that unit, into a second position, wherein it is disposed so as to be out of contact with the cassette during either insertion or ejection operations. In this embodiment the latch adapted to engage the cassette's recess to releasably lock the cassette within the processing unit may be connected to the pivotably mounted blade. In this manner, whenever the latch is withdrawn from the cassette's recess, the blade is simultaneously withdrawn from contact with the cassette's pod.

DESCRIPTION OF A FIRST PREFERRED EMBODIMENT

The preferred embodiments of this invention are illustrated as facilitating the application of a compatible processing fluid to a film structure which comprises both a photosensitive image-recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black-and-white images, a silver halide developer and a silver halide solvent are applied in an aqueous alkaline solution to be photoexposed silver halide stratum or emulsion where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive image visible, particularly when it is to be viewed in transmitted light.

However, as indicated above, the positive print may be rendered visible without separation of the silver halide and silver-receptive strata. For example, the silver-receptive stratum may be so constituted as to provide an unusually vigorous silver-precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver-precipitating environment, the resulting negative and positive images in superposition provide a composite that presents a good image for projection purposes as long as the images are carried on a light-transmitting support. Since the silver halide stratum and the silver-receptive stratum need not be separated, a simplification of the overall silver halide diffusion transfer-reversal process is achieved.

A composite film assembly of this type as well as processing compositions for producing a stable black-and-white image which can be viewed by transmitted light without the necessity of removing the processed negative image-containing photosensitive layer is shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U.S. Pats. of Edwin H. Land Nos. 2,726,154 issued Dec. 6, 1955 and 2,944,894 issued July 12, 1960. All of these prior patents are assigned to the assignee of the present invention.

However, it should be noted that the present invention is not directed to the chemistry by which visible images are formed in an exposed photosensitive material and/or formed in an image receiving stratum associated therewith. While an illustrated preferred embodiment of this invention is shown effecting the application of a compatible processing fluid to a film structure not requiring the removal of the photosensitive layer after visible image formation is completed, the invention itself is also applicable for use with other types of processing fluids and film structures.

The first illustrated embodiment of this invention may be best understood by now referring to FIGS. 1 and 2 of the drawings, which illustrate a cassette typical of the type with which this embodiment is intended to operate. As shown therein, a compact multipurpose film-handling cassette 10 is basically constituted by a pair of housing members 11 and 12 connected together to form an enclosed opaque housing. The housing member 12 is provided with a recessed portion 13 consisting of a support surface 14 disposed between a pair of opposed walls 16 and 18. Formed in respective opposed walls 16 and 18 are elongated parallel grooves 20 (see FIG. 5) which are adapted to slidably receive a removable cover plate 22. Thus, the support surface 14, the opposed walls 16 and 18 and the removable cover plate 22 in combination define an enclosed section 24 separated from a main section 26 of the cassette 10.

Cutout portions of the housing members 11 and 12 define an opening 28 through which image-carrying light rays may enter and/or leave the cassette 10 and, further, through which an aperture plate of a camera or of a projector may be introduced into the cassette. In this embodiment, the cassette 10 is relatively flat and generally rectangular parallelepiped in configuration. A supply spool 30 and a takeup spool 32 are coplanarly mounted within section 26 of the cassette 10 for rotation about parallel axes. A strip of unexposed photographic material 34, of the type previously discussed and provided with perforations 36 and leaders affixed to the supply spool 30 and to the takeup spool 32, is initially substantially entirely coiled around the supply spool. Passing from the supply spool 30 to the takeup spool 32, the strip of photographic material 34 sequentially travels around idlers 38, 40, 42, 44 and 46. Advantageously, the idlers 42 and 44 are positioned in opposite corners or extremities of the cassette 10 on the same side of the supply spool 30 and the takeup spool 32. Additionally, the idler 40 is advantageously positioned in the corner of the cassette 10 disposed on the other side of the supply spool 30 from the takeup spool 32 and on the opposite side of those spools from the idlers 42 and 44.

A rupturable pod 48 is positioned in the section 24 of the cassette 10 adjacent the support surface 14. The nature of this pod and the means by which it is ruptured will be described in considerable detail hereinafter. However, at this point it should be noted that this pod 48 includes a weakened seal 50 connected to a fluid feeding device 52 provided with an exit orifice 54. This orifice 54 in turn communicates through an opening 56 in the housing member 12 with a fluid reservoir chamber 58 of a dispensing container 60. Extending from the dispensing container 60 is a rectangular projection 62 which defines an orifice through which processing fluid within the reservoir chamber 58 may be expressed from the dispensing container. One edge of the end of the projection 62 is formed with a taper 64, the purpose of which will subsequently become obvious.

Guide tracks 66 and 68 are formed in an outside face of the dispensing container 60 for purposes of slidably receiving an actuator 70. This actuator 70 is formed with a leaf spring 72, which engages the inside face of the wall 74 of the cassette 10 to firmly seat the actuator in the guide tracks 66 and 68, and further, with a tang 76 extending over and across the side of the dispensing container 60 from which the projection 62 extends. A circular aperture 78 in the actuator 70 is positioned in alignment with an elongated slot 79 passing through the cassette's wall 74 in order that an externally mounted force applying member may be received thereinto for purposes of effecting an upward displacement of the actuator along the guide tracks 66 and 68 from its position as shown in FIG. 1 of the drawings. One end of a strip of flexible material 80 is spring mounted to the structure of the cassette 10 while its other end is connected to the tang 76. This strip of flexible material 80 is disposed over the end of the rectangular projection 62 and includes an opening positioned to be out of alignment with the orifice of that projection when disposed in the position illustrated in FIG. 1 and so as to be in alignment with that orifice when the actuator 70 is displaced to its upwardmost position along the guide tracks 66 and 68.

Additionally, a support member 82 is pivotably connected between the ends of a uniquely configured U-shaped spring 84 mounted on the dispensing container 60. It will be noted that this U-shaped spring 84 includes an offset 86 adapted to be engaged by the tang 76 when in its position as shown in FIG. 1.

Intermediate the idlers 40 and 42, the strip of photographic material 34 is disposed between and in spaced apart relationship to the strip of flexible material 80 and the support member 82. However, it will be appreciated that when the actuator 70 is displaced upwardly, the tang 76 is removed from contact with the offset 86 in the spring 84 thereby permitting the support member 82 to slidably engage the strip of photographic material 34 against that section of the strip of flexible material 80 disposed across the projection 62. Thus, when the actuator 70 is in its position as shown in FIG. 1, the dispensing container 60 is sealed by the strip of flexible material 80 and the strip of photographic material 34 may be transported between and out of contact with that strip of flexible material and the support member 82. Also, whenever the actuator 70 is moved upwardly along the guide tracks 66 and 68, the strip of flexible material 80 is displaced into an unsealing relationship with the dispensing container 60 and the support member 82 slidably engages the strip of photographic material 34 against the strip of flexible material.

The rupturable pod 48 initially contains a quantity of processing fluid suitable to form visible images from the images recorded on the strip of photographic material 34 during exposure operations. Typically, the walls of the rupturable pod 48 consist of an outer layer of pouch or glassine paper, an intermediate layer of lead foil and an inner layer of polyvinylchloride material. The polyvinylchloride layers are bonded together adjacent their edge portions to effect the sealing of the fluid filled cavity with the seal 50 being substantially weaker than the seals around the other edges of the pod 48. Typically, the walls of the fluid-feeding device 52 are formed of an outer layer of pouch or glassine paper bonded to an inner layer of polyethylene material. Again the polyethylene material layers may be bonded together where appropriate and also bonded to the outer layer of the walls of the pod 48 to connect the fluid-feeding device to the pod. Preferably, the outside surface of the assembly comprising the pod 48 and the fluid-feeding device 52 adjacent the support surface 14 is adhered thereto by any suitable means to facilitate fixedly positioning that assembly within the cassette's enclosed section 24.

It should be noted that the capacity of the reservoir chamber 58 of the dispensing container 60 should be equivalent to or greater than that of the rupturable pod 48. For instance, approximately 2 cc., of processing fluid is sufficient to treat 50 feet of Super-8 format film. Under such conditions, the pod 48 will have a capacity of 2 cc. and the capacity of the dispensing container's reservoir chamber 58 will be on the order of 2 to 2½ cc. It will be appreciated that the application of a compressive force progressively along the length of the pod 48 toward its weakened seal 50 and across the fluid-feeding device 52 will first effect a rupturing of the pod along the seal 50 and then cause the processing fluid initially stored therein to be expelled therefrom into the dispensing container's reservoir chamber 58.

Mounted between the housing member 12 and the wall 74 of the housing member 11 is a light-sealing arcuate member 87, one end of which is positioned against the dispensing container 60. The other end of the member 87 is connected to one end of a second light-sealing arcuate member 88 which extends to within the vicinity of the idler 44. These arcuate members 87 and 88, in combination with the dispensing container 60, serve to effectively divide the section 26 of the cassette 10 into a first compartment 90 sealed in a light tight manner from a second compartment 92. Additionally, it will be noted that in the illustrated embodiment of the cassette, the supply spool 30, the light-sealing arcuate member 87 and a wall 94 of the dispensing container 60 share a common axis. Thus, the arcuate member 87 and the wall 94 further serve to control the disposition of that portion of the strip of photographic material 34 coiled around the supply spool 30 within the cassette 10. Similarly, the takeup spool 32 and the light-sealing arcuate member 88 share a common axis and, consequently, the arcuate member 88 serves to control the disposition of the portion of the strip of photographic material 34 coiled around the takeup spool within the cassette 10.

It should also be noted at this point that the wall 74 of the cassette 10 is provided with an opening 96 communicating with the aforementioned opening 28 of the cassette. As will subsequently become more apparent, this opening 96 permits light rays from an external light source to be introduced into the cassette 10 for film projection purposes.

As shown in FIG. 1, a resilient member 98 is connected to the inside face of the wall 74 by any suitable means, such as rivets 100, and extends over and in spaced relationship to the end surfaces 102 and 104 of the idlers 44 and 46, respectively. Provided in the wall 74 is an aperture 106 disposed over the resilient member 98 whereby an external force applying member may be selectively introduced into the cassette 10 to urge the resilient member's end portions 108 and 110 into frictional engagement with the idlers 44 and 46, respectively, to restrain further rotational movement of those idlers. In order to effectively light seal the interior of the cassette 10, a ring 112 mounted on the resilient member 98 is coaxially disposed with respect to the aperture 106 and adapted to seat in an annular recess 114 of the wall 74.

Mounted within compartment 92 of the cassette 10 so as to be in alignment with the opening 28 is a pressure plate assembly 116 in which is mounted a light-reflecting element 118. It will be noted that this light-reflecting element 118 is disposed in operable relationship to both the opening 28 and the opening 96 of the cassette 10. In the illustrated embodiment of the cassette, the light-reflecting element 118 is prismatic in nature and includes a concave light-receiving transparent face 120 and a flat reflecting surface 122 which reflects light received into the element through the light-receiving face 120 outwardly thereof through a convex transparent face 124.

The pressure plate assembly 116 includes a leaf spring 126 which seats against a boss 128 formed integrally with the housing member 12 to continually urge the pressure plate assembly toward the cassette's opening 28. The pressure plate assembly 116 is mounted within the cassette 10 so that it may be displaced inwardly of the cassette from the opening 28 against the force of the spring 126 when the aperture plate of a camera or a projector is positioned in operative relationship therewith. Forming part of the pressure plate assembly 116 is a mounting bracket 130 which serves to fixedly position the light reflecting element 118 with respect to the pressure plate assembly and, more particularly, with respect to an aperture 132 of that assembly.

The spools 30 and 32 are respectively provided with fluted recesses 134 and 136 which are adapted to receive externally mounted drive means through apertures 138 and 140 appropriately provided through the cassette's wall 74. Thus, the cassette 10 includes means for reversably transporting the strip of photographic material 34 between the supply spool 30 and the takeup spool 32 across the dispensing container's projection 62 and the pressure plate assembly 116. The cassette's opening 28 constitutes a film gate adapted to serve as an exposure station during a first pass of the photosensitive film strip 34 across the pressure plate assembly 116 and as a projection station during subsequent operations in which the film strip, in a fully processed condition, is advanced from the supply spool 30 to the takeup spool 32.

Idler 42, around which the film strip 34 passes on its way from the supply spool 30 to the pressure plate assembly 116 may, if desired, be mounted on a movable post spring biased toward the corner which it occupies in the housing of the cassette 10 and capable of being moved resiliently inward away from that corner. Also, idler 44 may be spring biased toward the corner which it occupies in the housing in the cassette 10 and capable of being moved resiliently inward away from that corner. This represents one way to minimize strain exerted on the film strip 34 by the conventional intermittent film advancement structure during these exposure and projection operations. It will be appreciated that the housing members 11 and 12, as well as elements associated therewith, e.g., the light-sealing members 87 and 88, and the boss 128 may, for example, be formed from a suitable thermoplastic resin such as an acrylic or a polystyrene, in an inexpensive injection molding process. Similarly, the dispensing container 60, the idlers 38, 40, 42, 44 and 46, and the cover plate 22 may be formed by injection molding processes employing the same types of material.

Some of the features of the cassette embodiment illustrated in FIGS. 1 and 2, e.g., the rupturable pod-fluid feeding device assembly, the snubbing arrangement, the applicator system, the pressure plate assembly, the light-reflecting element and the film gate arrangement, are the subject of certain of the aforementioned copending applications. They have been illustrated and briefly described herein for purposes of imparting a complete understanding of the present invention. As will become apparent, the present invention may be employed with other forms of rupturable pod-mounting devices.

As previously indicated, the present invention is directed to improved apparatus for receiving and selectively ejecting such devices, for rupturing the fluid-containing pod of such devices, for expelling the fluid initially stored therein into an applicator system and for effecting the coating of a strip of photographic material with such fluid. The apparatus adapted to receive such devices includes features of the present invention and preferably facilitates not only the processing of the film strip, but also the projection, for viewing purposes, of the visible images formed on that film strip during the processing operation.

FIGS. 3, 4 and 5 of the drawings illustrate a section of such a processor-projector unit 142 having a receiving chamber 144 adapted to receive the cassette 10. After the strip of photographic material 34 has been exposed with the cassette 10 mounted in an appropriate camera (not shown) in its travel from the supply spool 30 onto the takeup spool 32 and before inserting the cassette into the processor-projector unit 142, the cover plate 22 is removed. Insertion of the cassette 10 into the receiving chamber 144 is effected through a slot 146 provided in the top panel 148 of that unit and with the side of the cassette containing the opening 28 first passing through that slot.

The cassette's receiving chamber 144 is formed of interconnected support plates 150, 152, 154, 156 and 158. A plurality of elongated standoffs 160, mounted in vertical alignment on the support plates 150, 152, 154 and 156 and extending from those plates interiorly of the cassette-receiving chamber 144, and a pair of standoffs 162, extending from the support plates 158, in combination, serve to first guide the cassette 10 into that chamber, and once the cassette has been fully inserted therein, to support and align the cassette. Typically, the support plates 150, 152, 154, 156 and 158 are formed from a material such as stainless steel while the standoffs 160 and 162 are formed of a polymeric material such a polytetrafluoroethylene. When fully inserted into the receiving chamber 144 (position of cassette 10 shown in phantom in FIG. 3), the cassette 10 is seated against the standoffs 162. Preferably, the cassette receiving chamber 144 is oriented within the processor-projector unit 142 so that the cassette 10 is inserted vertically downward thereinto through the slot 146.

Extending through the processor-projector unit's support plate 158 is a telescoping container 164 comprising a first section 166 fixedly mounted to the support plate 158 and a second section 168 slidably disposed within the telescoping container's first section. A compression spring 170 housed within the container 164 continually urges the two sections 166 and 168 of that container into their fully extended positions. This container 164 is positioned so as to be engaged by, and compressed into its loaded condition by, the cassette 10 as the cassette is inserted into the receiving chamber 144. When loaded, the spring 170 tends to eject the cassette 10 from the processor-projector unit 142. However, a latch 172 of the processor-projector unit 142 serves to releasably retain the cassette 10 in the receiving chamber 144 against the force of the spring 170 in a manner to now be described.

The latch 172 is spring mounted from the processor-projector unit's support plate 152 and extends through an opening 174 therein. Provided in the outside face of the cassette's housing member 12 is a recess 176 which is located to automatically receive the latch 172 when the cassette 10 is seated against the standoffs 162. The spring 178 terminates in a finger portion 180. Spring mounted through the processor-projector unit's top panel 148 is a button 184 disposed in alignment with the finger portion 180 of the spring 178. It will thus be appreciated that, after the cassette 10 has been seated against the standoffs 162 and the latch 172 has entered the cassette's recess 176, the operator may selectively depress the button 184 to effect an ejection of the cassette from the processor-projector unit 142.

Extending inwardly of the receiving chamber 144 from the support plate 152 is a bracket 186 which rotatably supports a roller 188. Similarly, a bracket 192 extends from the support plate 150 to rotatably support a roller 194. In this connection the opposed flanged portions 196 of the bracket 186 and the opposed flanged portions 197 of the bracket 192 are each provided with an elongated slot or guide track 198 having a first section 200, canted inwardly and downwardly of the receiving chamber 144, and a second section 202, disposed in vertical alignment with the receiving chamber. The rollers 188 and 194 are respectively mounted on shafts 204 and 206, the opposite ends of which seat in the guide tracks 198 associated with the opposed flanged portions 196 and 197 of the brackets 186 and 192, respectively. These rollers 188 and 194 may be fixedly mounted on their respective shafts 204 and 206 as shown in the illustrated embodiment so that the rollers and their shafts rotate as a unit within the guide tracks 198 or, alternately, the rollers 188 and 194 may be mounted for rotation about their respective shafts 204 and 206. For example, the roller 188 and 194 may be formed of a metal such as stainless steel, of a resiliently compressible material such as a hard rubber, or of a polymeric material such as polytetrafluorothylene.

It will be recognized that the configuration of the guide tracks 198 of the brackets 186 and 192 is such that, prior to inserting a cassette 10 into a processor-projector unit 142, the weight of the rollers 188 and 194 will cause their respective shafts 204 and 206 to be positioned in the second sections 202 of the guide tracks 198. It is important to note that these rollers 188 and 194 are mounted on parallel axes of rotation adjacent the slot 146 in the processor-projector unit's top panel 148. Further, when the shafts 204 and 206 are positioned in the second sections 202 of their respective guide tracks 198, these rollers 188 and 194 are spaced apart such that the roller 188 firmly presses against the cassette's rupturable pod 48 as the cassette 10 is inserted into the receiving chamber 144. Simultaneously, the roller 194 supports the cassette against the force exerted thereon by the roller 188. In this respect, when its shaft 204 is located in the sections 202 of the associated guide tracks 198, the roller 188 is positioned to be in alignment with the recessed portion 13 of the cassette's housing member 12 as the cassette is inserted into the receiving chamber 144. Further, the roller 188 is of a length slightly less than the distance between the opposed walls 16 and 18 of that recessed portion 13 of the cassette 10.

As the cassette 10 is partially inserted into the receiving chamber 144, the roller 188 initially contacts the end of the rupturable pod 48 furthermost disposed from its weakened seal 50. In the course of completing the insertion process, that roller 188 progressively applies a force against the pod 48 toward its weakened portion 50 and across the fluid-feeding device 52. Thus, as the cassette is inserted into the receiving chamber 144, the roller 188 automatically effects a rupturing of the pod 48 and causes the processing fluid initially stored therein to be expelled therefrom into the fluid-receiving chamber 58 of the dispensing container 60. The vertical alignment of the second sections 202 of the guide tracks 198 prevents any tendency the shafts 204 and 206 might otherwise have to back up the canted sections 200 of the tracks responsive to the force exerted by the cassette 10 on the rollers 188 and 194, respectively, during the cassette insertion process. As depicted in FIG. 3, the pod's weakened seal 50 has been ruptured and a portion of the processing fluid contained between the opposed walls of that pod 48 has been expelled therefrom through the fluid-feeding device 52.

While the unique mounting arrangement for the rollers 188 and 194 initially positions those rollers so as to automatically apply a substantial compressive force against the cassette 10 as it is inserted into the receiving chamber 144, it permits those rollers to be displaced in opposite directions away from the cassette as the cassette is ejected from that chamber. More specifically, when the operator depresses the button 184 to disengage the latch 172 from the cassette's recess 176, the cassette begins its upward movement within the receiving chamber 144 and exerts a force against the rollers 188 and 194 which effects a displacement of their respective shafts 204 and 206 into the first sections 200 of the guide tracks 198. At such time, the rollers 188 and 194 exert substantially no force against the cassette 10 tending to resist its ejection from the processor-projector unit 142. Once the cassette 10 is removed from the receiving chamber 144, the rollers 188 and 194 return to their original positions wherein their respective shafts 204 and 206 are once again disposed in the second sections 202 of the guide tracks 198.

It is preferred that the telescoping container 164 be designed to displace the cassette 10 upwardly within the receiving chamber 144 to a position where it is easily accessible for manual removal from the unit 142, rather than to actually propel the cassette from that unit. However, it is to be understood that as used herein the terms "ejecting," "ejection," etc., are employed in a broad sense, i.e., to cover either of these situations.

Slidably mounted within the processor-projector unit 142 are a pair of drive shafts 212 and 214. After the cassette 10 has been fully inserted into the receiving chamber 144 of the processor-projector unit 142, these drive shafts 212 and 214 may be selectively displaced (means not shown) into engagement with the fluted recesses 134 and 136 of the cassette's supply spool 30 and takeup spool 32 through apertures 138 and 140, respectively, such apertures being appropriately provided in the cassette's wall 74 (see FIG. 2). These drive shafts 212 and 214 may then be alternately energized by the motor (not shown) of the processor-projector unit 142 to effect selective reversible transport of the strip of photographic material 34 within the cassette 10 between the supply spool 30 and the takeup spool 32. The processor-projector unit 142 also includes a displaceably mounted force-applying member (not shown) which may be selectively introduced through the slot 79 in the cassette's wall 74 once the cassette is seated against the standoffs 162 to effect selective reversible displacement of the actuator 70 along the guide tracks 66 and 68.

OPERATION OF THE FIRST PREFERRED EMBODIMENT

To summarize the operation of this embodiment of the invention, the cassette 10 is initially furnished with substantially all of the filmstrip 34 in an unexposed condition coiled on the supply spool 30, with the processing fluid contained in the rupturable pod 48 and with the actuator 70 disposed in its position shown in FIG. 1. For exposure purposes, the cassette 10 is mounted in an appropriate camera (not shown) with the drive means of the camera engaging the recess 136 of the takeup spool 32 through a friction clutching arrangement as is conventional. While the particular camera employed does not form part of the present invention, it may advantageously take the form of that described in the aforementioned copending application Ser. No. 813,427 filed Apr. 4, 1969. It will be noted that the camera described in that application includes a door-mounted pin which automatically enters the cassette 10 through its aperture 106 to snub the idlers 44 and 46 whenever the cassette is mounted therein. The aperture plate of the camera, which may also take a conventional form, operably engages the cassette's pressure plate assembly 116 to position the section of the filmstrip 34 disposed thereacross in the proper focal plane. Also a conventional intermittent film advancement mechanism of the camera engages the perforations 36 of the filmstrip 34 to effect proper step advancement of the filmstrip along the pressure plate assembly 116. In this manner, the operator can selectively record images on the photosensitive filmstrip 34 as it traverses the cassette's opening 28 on its way from the supply spool 30 to the takeup spool 32. In the illustrated embodiment of the cassette 10, the photosensitive surface of the filmstrip 34 faces inwardly of the cassette 10 such that exposure of the photosensitive emulsion is effected through the transparent film base. After the filmstrip 34 has been completely exposed, the cassette 10 can be quickly removed from the camera and replaced when desired by an identical cassette containing unexposed film.

When convenient, the film-processing operation can be initiated by first removing the cassette's cover plate 22 and then inserting the cassette into the receiving chamber 144 of the processor-projector unit 142 intermediate the rollers 188 and 194 and against the force of the compression spring 170. During this insertion process, the fluid-containing pod 48 is automatically ruptured by the roller 188 and the fluid initially retained therein expelled therefrom through the fluid-feeding device into the reservoir chamber 58 of the dispensing container 60. The aforementioned force-applying member (not shown) is then introduced into the cassette through its elongated slot 79 to effect a displacement of the strip of flexible material 80 from its sealing relationship over the dispensing container's projection 62 into an unsealing relationship therewith and to cause the support plate 82 to slidably engage the filmstrip 34 against that section of the strip of flexible material disposed over the projection 62.

By now turning an appropriate switch located on the control panel (not shown) of the processor-projector unit 142, the exposed strip of material is returned from the takeup spool 32 to the supply spool 30. During this sequence, the exposed photographic filmstrip 34 passes across the dispensing container's projection 62 and draws processing fluid from the reservoir chamber 58 of the container 60 to form a uniform fluid coating along its entire length. In this respect, it will be noted that, with the cassette 10 inserted into the unit 142, the projection 62 is disposed at the lowermost point of the dispensing container 60 so that the force of gravity causes the processing fluid to be continually fed through the projection 62 from the reservoir chamber 58. The thickness of the strip of flexible material 80 is determinative of the thickness of the fluid coating applied to the filmstrip 34 and the taper 64 provides a relatively sharp doctor blade for applying that coating to the filmstrip.

The motor of the processor-projector unit 142 is automatically deenergized by conventional means (not shown) as soon as the entire length of exposed filmstrip 34 has been treated with processing fluid. At this time, the force-applying member of the processor-projector unit 142 engaging the cassette's actuator 70 should be withdrawn from the cassette 10 to permit the actuator to return to its original position, wherein the orifice through the dispensing container's projection 62 is sealed by the strip of flexible material 80, and, further, wherein the filmstrip 34 is permitted to return to its original position out of contact with both the strip of flexible material and the support plate 82. Additionally, the operator should now effect a snubbing of the cassette's idlers 44 and 46. This may be accomplished by displacing a pin (not shown) mounted in the processor-projector unit 142 adjacent the cassette's aperture 106 into engagement with the cassette's resilient member 98.

The processor-projector unit 142 also includes other conventional means not illustrated in the drawings associated with the projection of the visible images recorded on the fully processed filmstrip 34. These include an aperture plate and an intermittent film advancement mechanism position in operable relationship to the cassette's pressure plate assembly 116 through the cassette's opening 28, and a light source positioned in operable relationship to the cassette's opening 96. Additionally, such other conventional means include a shutter mechanism and a lens system. By now turning another switch (not shown) located on the control panel of the processor-projector unit 142, that unit's light source and motor are simultaneously energized, in this instance the motor driving both the aforementioned intermittent film-advancement mechanism of the unit 142 and the cassette's takeup spool 32 through the drive shaft 214. As the now fully processed filmstrip 34 is once again drawn across the cassette's opening 28 onto the takeup spool 32, visible images retained thereon are projected for viewing purposes. In this connection the processor-projector unit's aperture plate acting against the cassette's pressure plate assembly 116 accurately positions the sections of the filmstrip 24 progressively disposed therebetween at a proper film plane for projection purposes. Simultaneously, light rays from the light source of the processor-projector unit 142 enter the cassette 10 through its opening 96 and are redirected by the light-reflecting element 118, through the aperture 132 in the pressure plate assembly 116 and the sections of the filmstrip 34 intermittently positioned thereover, outwardly of the cassette through its opening 28.

Again, conventional means (not shown) automatically deenergize the light source and motor of the processor-projector unit 142 once the visible images on the entire processed film strip 34 have been projected. During these processing and projection operations, the latch 172 is seated in the cassette's recess 176 to "lock" the cassette in the receiving chamber 144 of the processor-projector unit 142 against the force exerted thereon by the telescoping container 164.

Preferably, the film strip 34 is returned from the takeup spool 32 to the supply spool 30 before removing the cassette 10 from the processor-projector unit 142. Ejection of the cassette 10 from that unit 142 is effected by the operator's depressing the button 184 to withdraw the latch 172 from the cassette's recess 176. During the upward movement of the cassette 10 within the receiving chamber 144 under the force of the spring 170, the rollers 188 and 194 are displaced in a direction away from each other along the guide tracks 198 so as to substantially exert no force against the cassette tending to prevent its ejection from the processor-projector unit 142.

The other embodiments of the present invention illustrated in the drawings will now be described. The same numerals primed have been employed in the figures of the drawings pertaining to these embodiments to denote the parts thereof which remain substantially unchanged from the first described embodiment.

DESCRIPTION OF THE EMBODIMENT ILLUSTRATED IN FIGURES 6 AND 7

In this embodiment of the invention, one end 216 of a latch 218 is pivotably connected from the support plate 152'. Its pivotable motion in a clockwise direction, as viewed in FIG. 6, is restrained by a lip 220 extending from the latch's other end 222 through an opening 224 in the support plate 152' and which is adapted to engage a portion 226 of that support member. A spring 228 connected to an arm 230, which arm extends from the latch 218 through the opening 224 in the support member 152', continually exerts a force on the latch tending to seat the lip 220 against the portion 226 of the support member 152'. Slidably disposed through an aperture 232 in the top panel 148' of the processor-projector unit 142' is a button 234 from which a pin 236 extends into contact with the arm 230. A spring 238 is disposed between the button 234 and a projection 240 extending from the support plate 152' to continually urge the button into its upwardmost position within the aperture 232. It will thus be seen that, once the cassette 10' is fully inserted into the receiving chamber 144' against the force of the spring 170', the latch 218 may be disengaged from the cassette's recess 176' by depressing the button 234. Once the cassette 10' has been ejected from the processor-projector unit 142' and the button 234 released, the force of the spring 228 will automatically return the latch 218 to its original position wherein it will once again automatically engage the cassette's recess 176' whenever cassette 10' is inserted into the receiving chamber 144'.

One end 242 of a blade 244 is pivotably mounted from the processor-projector unit's top panel 148' and this blade is adapted to extend into the cassette-receiving chamber 144' through an opening 245 in the support plate 152'. A spring 246 continually tends to rotate the blade 244 in a clockwise direction as viewed in FIG. 6. However, such clockwise rotation of the blade 244 is restrained by a member 248 which is pivotably mounted from the support plate 152' and which also extends through the opening 245 therein. A spring 250 acting against the member 248 continually tends to seat that member against a surface 255 which, in part, defines the opening 245 through the support plate 152'. A projection 254 extending downwardly from the button 234 seats against the end of the member 248 furtherest removed from the blade 244. When disposed in the position illustrated in FIG. 6, the edge 258 of the blade 244 is adapted to engage the pod 48' during the process of inserting the cassette 10' into the receiving chamber 144', to effect the rupturing of that pod and to expell therefrom the processing fluid initially retained therein.

It will be appreciated that whenever the operator depresses the button 234 to disengage the latch 218 from the cassette's recess 176', the button's projection 254 will effect a counterclockwise rotation of the member 248 thereby permitting the force of the spring 246 to pivot the blade 244 into its position shown in phantom in FIG. 6. At such time, the blade 244 exerts no force against the cassette 10' tending to restrain its ejection from the processor-projector unit 142' under the force of the loaded spring 170'. The force of the spring 250 is greater than that of the spring 246 so that, when the button 234 is not depressed, these springs will position the members 248 and the blade 244 in their original positions as depicted in FIG. 6.

As may be seen in FIG. 7 of the drawings, the blade 244 is positioned to be in alignment with the recessed portion 13' of the cassette's housing member 12' as the cassette 10' is inserted into the receiving chamber 144' and, further, is of a length slightly less than the distance between the opposed walls 16' and 18' of that portion of the cassette. Also it will be noted that a support bracket 260 extends inwardly of the receiving chamber 144' and rotatably mounts a roller 262 which is positioned to support the cassette 10' against the force exerted thereon by the blade 244 during the insertion process. This roller 262 may, for example, be formed of a metal such as stainless steel, of a resiliently compressible material such as hard rubber or of a polymeric material such as polytetrafluoroethylene.

DESCRIPTION OF THE EMBODIMENT ILLUSTRATED IN FIGURES 8 AND 9

A cassette 266 may be identical in form to the cassette 10 illustrated in FIGS. 1 and 2 of the drawings except for the nature of its removable cover plate 268 and the mounting means therefor. The cassette 266 comprises housing members 11' and 12', the latter of which is provided with a recessed portion 13' defined by the support surface 14' and opposed walls 16' and 18'. Mounted within the recessed portion 13' against the support surface 14' is the assembly consisting of the rupturable fluid-containing pod 48', having the weakened seal 50', and the fluid-feeding device 52'.

The removable cover plate 268 may be formed of any suitable material such as an acrylic or a polystyrene and overlays the rupturable pod 48' and the fluid-feeding device 52'. As best seen in FIG. 9 of the drawings, this cover plate 268 has a substantial thickness. For instance, in one arrangement, the overall thickness of the two opposed walls of the rupturable pod 48' is 0.015 inch, while the cover plate 268 has a thickness of 0.060 inch. A plurality of "S-shaped" connectors 270 extending between the cover plate 268 and adjacent portions of the opposed walls 16' and 18' serve to yieldably and releasably support the cover plate over the rupturable pod 48' and fluid feeding device 52'. In this respect, these connecting members 270 may comprise thin strips of any suitable material, such as that from which the removable cover plate 268 and housing members 11' and 12' are formed, and their respective ends may be connected to the cover plate housing members by any suitable means such as welding. The original position of the cover plate 268 within the recessed portion 13' is shown in phantom in FIG. 9. At such time the processing fluid is retained within the rupturable pod 48', which pod is disposed between the inside face of the cover plate 268 and the support surface 14'. It will be appreciated that the yieldable nature of the connecting members 270 and their "S-shaped" configuration facilitate the subsequent displacement of the cover plate 268 under the force of an externally mounted force applying member inwardly of the cassette 266 for purposes of transmitting a compressive force against the pod 48'.

In FIG. 9 of the drawings, the position of the removable cover plate 268 is depicted at such time as that member has been pressed against the pod 48' to effect a rupturing thereof and to cause the processing fluid initially retained therein to be expelled therefrom through the fluid-feeding device 52' into the reservoir chamber of the cassette's dispensing container. In order to facilitate the subsequent removal of the cover plate 268 from the cassette's housing member 12', each connecting member 270 is provided with a recess 272 at a point adjacent its respective opposed wall 16' or 18'. Thus, each connecting member 270 includes a weakened portion adapted to be broken whenever a reasonable amount of force is applied to the cover plate 268 tending to pull the cover plate away from the cassette's housing member 12'.

In this illustrated embodiment of the invention, a processor-projector unit 274 may be identical in form to the unit 142 illustrated in FIGS. 3–5 of the drawings except for the mounting means associated with rollers 188' and 194'. In the present embodiment, these rollers 188' and 194' are respectively mounted in brackets 276 and 278 for rotation about fixedly positioned parallel axes. These rollers 188' and 194' are spaced apart a distance such that, when the cassette 266 is inserted therebetween into the processor-projector unit's receiving chamber 144', the roller 188' first engages the leading edge 280 of the cover plate 268 and then displaces progressive sections of that cover plate inwardly of the cassette against the rupturable pod 48' and fluid-feeding device 52' to rupture that pod and to expel therefrom the fluid initially retained therein. During this insertion process, the roller 194' acts against the outside face of the housing member 11' on the opposite side thereof from the roller 188' to support the cassette 266 against the force exerted thereon by the pod-rupturing roller 188'. In FIG. 8, the cassette 266 is depicted as being partially inserted into the receiving chamber 144' of the processor-projector unit 274. At such time the weakened seal 50' of the pod 48' has been ruptured and the processing fluid partially expelled therethrough.

After the processing and projection operations have been completed and the cassette 266 ejected from the processor-projector unit 274, the operator may exert a pulling force against the cover plate 268 to effect a breaking of the connecting members 270 adjacent their recesses 272 and the removal of the cover plate from the cassette. This cover plate may then be discarded and, most advantageously, subsequent insertions and ejections of the cassette 266 from the processor-projector unit 274 may be effected with no contact being made between the roller 188' and the cassette.

DESCRIPTION OF THE EMBODIMENT ILLUSTRATED IN FIGURES 10–12

In this embodiment of the invention a cassette 284 may take a form similar to that of the cassette 10 illustrated in FIGS. 1 and 2 of the drawings except for the removable cover plate of that cassette. In lieu thereof, the cassette 284 includes a force-applying member 286 mounted between the opposed walls 16' and 18' of the recessed portion 13' for slidable displacement across the rupturable pod 48' and the fluid-feeding device 52'. For purposes of slidably mounting the member 286 to the cassette, the opposed ends of that member are provided with projections 288 and 289 adapted to seat in elongated grooves 291 and 292 appropriately provided in opposed walls 16' and 18', respectively (see FIG. 12). These elongated grooves 291 and 292 extend to a point within the vicinity of the respective ends of the opposed wall 16' or 18' in which they are formed. It is most desirable that the force-applying member 286 be substantially rigid and may, for example, be formed of a relatively thick piece of an acrylic or a polystyrene material. Thus, the force-applying member 286 is adapted to be displaced from its original position (shown in phantom in FIG. 10), wherein it is located adjacent the end of the rupturable pod 48' furthermost removed from its weakened seal 50', across that pod and the fluid-feeding device 52'. Also, the thickness of the force-applying member 286 and its position within the cassette 284 is such that, during such displacement, the force-applying member exerts a force against the pod 48' first causing its weakened seal 50' to rupture and then the fluid initially retained therein to be expelled therefrom through the fluid-feeding device 52'.

Additionally, a recess 294 is formed on each of the projections 288 and 289. When the member 286 is displaced to its uppermost position (as viewed in FIG. 10) along the grooves 291 and 292, these recesses 294 are adapted to automatically receive lips 296 appropriately formed on the opposed walls 16' and 18', respectively. At such time, i.e., when the lips 296 are seated in the recesses 294, the force-applying member 286 is locked in position within the cassette 284 and further displacement thereof along the grooves 291 and 292 is precluded. In order to facilitate proper and smooth action between the force applying member 286 and the rupturable pod 48' and the fluid-feeding device 52' during the displacement of the force-applying member thereacross, the leading edge 298 of that member is provided with a contoured portion 300.

A processor-projector unit 302 may be similar in form to the unit 142 depicted in FIGS. 3 through 5 in the drawings except for that unit's rollers 188 and 194 and the means by which such members are mounted therein. In lieu thereof, the processor-projector unit 302 includes a support 304 mounted from its top panel 148' and which is provided with a pair of spaced-apart fingers 306 and 308 (see FIG. 12) extending therefrom inwardly of the cassette-receiving chamber 144'. These fingers 306 and 308 are positioned to engage the cassette's force-applying member 286 as the cassette is first introduced into the processor-projector unit 302 such that further downward displacement of that member within the receiving chamber 144' is precluded as the insertion process is completed. Thus, as the cassette 284 is inserted into the processor-projector unit 302, the force-applying member 286 automatically effects a rupturing of the pod 48' and causes the processing fluid initially retained therein to be expelled therefrom through the fluid-feeding device 52'.

A mounting bracket 310 extending inwardly of the cassette-receiving chamber 144' from the support plate 150' rotatably mounts a roller 312 for rotation about a fixedly positioned axis. This roller 312 is located to engage the cassette 284 on the opposite side thereof from the force-applying member 286 and to support the cassette against the force exerted thereon by that force-applying member during the insertion process.

It will be noted that in this embodiment the cassette 284 does not include any components which must be removed therefrom either before or after it is inserted into the processor-projector unit 302. Additionally, during subsequent insertions of the cassette 284 into the unit 302, there is no contact between the fingers 306 and 308 extending from the support 304 and any portion of the cassette until such time as the cassette is seated against the standoffs 162'.

DESCRIPTION OF THE EMBODIMENT ILLUSTRATED IN FIGURES 13–15

In this embodiment of the invention, a cassette 314 may be identical in form to the cassette 10 illustrated in FIGS. 1 and 2 of the drawings except for the specific form of cover plate overlying the rupturable pod 48' and fluid-feeding device 52'. In the present embodiment, a cover plate 316 is mounted for slidable movement along the elongated grooves 291' and 292' respectively provided in the opposed walls 16' and 18' of the cassette's housing member 12'. The cover plate 316 is provided with a force-applying member 318 extending from the inside face thereof along one edge thereof so as to be initially positioned adjacent that end of the rupturable pod 48' furthermost removed from the fluid-feeding device 52'.

Figure 14:
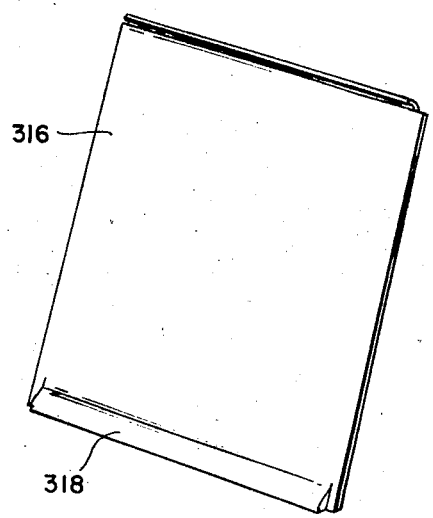
FIG. 14 is a diagrammatic perspective view of the slidable cover plate and force-applying member forming part of the cassette in the embodiment of this invention illustrated in FIG. 13.
Figure 13:
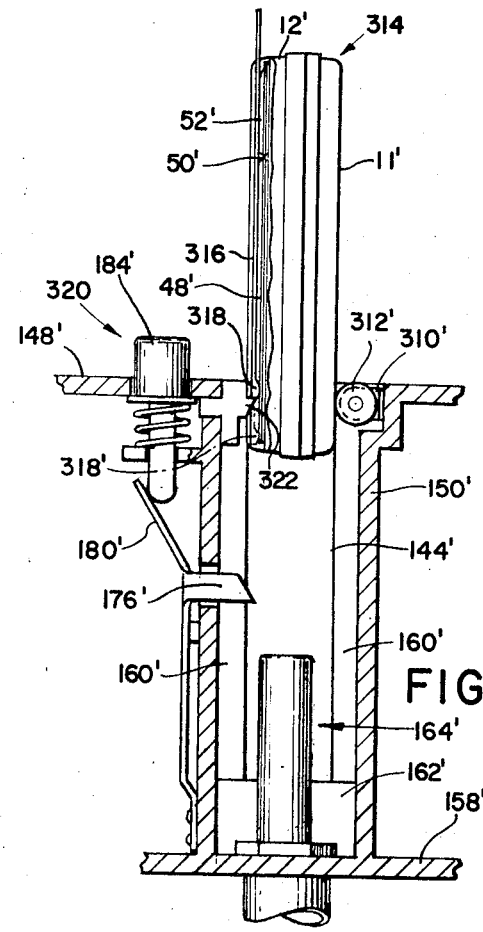
FIG. 13 is a fragmentary diagrammatic vertical sectional view of a fifth embodiment of the present invention showing a cassette partially inserted into the cassette-receiving means of a processor-projector unit.

In the embodiment illustrated in the drawings, this force-applying member 318 is formed integrally with the cover plate 316 (see FIG. 14). Typically, such an assembly may be formed of an acrylic or a polystyrene material in an injection molding process. The force-applying member 318 extends inwardly of the cassette's recessed portion 13' so that upward (as viewed in FIG. 13) displacement of the cover plate 316 along the grooves 291 and 292 will effect a displacement of the force-applying member from its initial position within the cassette 314 (shown in phantom in FIG. 13) across the rupturable pod 48' and fluid-feeding device 52'. Thus, during such a displacement of the cover plate 316, the force-applying member 318 will be pressed against the pod 48' to first effect a rupture of its weakened seal 50' and then to cause the fluid initially retained therein to be expelled therefrom through the fluid-feeding device 52'.

Figure 15:
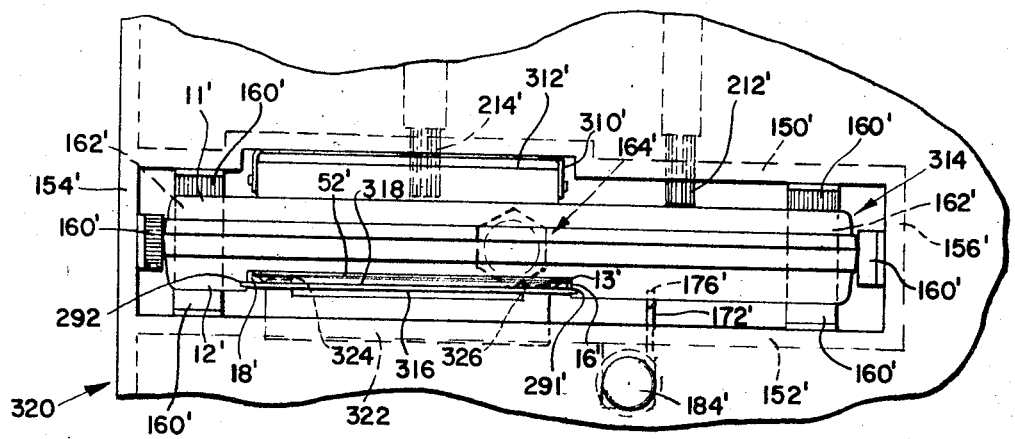
FIG. 15 is a partial plan view of the embodiment of this invention illustrated in FIG. 13 showing the cassette fully inserted into the cassette-receiving means of the processor-projector unit.

A processor-projector unit 320 (see FIGS. 13 and 15) may be virtually identical in form to the processor-projector unit 302 illustrated in FIGS. 10 and 12 of the drawings. In this respect, as depicted, the unit 320 includes a support 322 mounted from the unit's top panel 148' and which includes a pair of spaced-apart fingers 324 and 326 extending therefrom inwardly of the cassette's receiving chamber 144'. These fingers 324 and 326 are positioned to engage the leading edge of the cover plate 316 as the cassette 314 is introduced into the receiving chamber 144' so as to preclude that plate's further downward displacement into the processor-projector unit 320 as the cassette insertion process is completed. Thus, the pod 48' is automatically ruptured by the force-applying member 318 and the processing fluid initially retained therein expelled therefrom through the fluid-feeding device 52' during the completion of the cassette insertion process.

Additionally, a bracket 310' extending inwardly of the receiving chamber 144' from the support plate 150' rotatably mounts a roller 312' substantially in alignment with the fingers 324 and 326. This roller 312' is positioned to engage the outside face of the cassette's housing member 11' as the cassette 314 is inserted into the processor-projector unit 320 whereby the cassette is supported by that roller against the force exerted thereon by the force-applying member 318.

This embodiment of the invention is similar to that illustrated in FIGS. 10 through 12 in that the force-applying member, adapted to effect a rupturing of the pod 48' and to cause the fluid initially retained therein to be expelled therefrom, forms part of the cassette itself. However, it differs from that embodiment in that the cassette 314 includes a cover plate 316 effective to preclude premature accidental rupturing of the pod 48'.

While the cover plate 316 may be repositioned within the cassette 314 over the ruptured pod 48' and fluid feeding device 52' after the cassette 314 has been ejected from the processor-projector unit 320, it is preferably discarded at that time. This arrangement permits subsequent insertions of the cassette 314 into the processor-projector unit 320 to be effected with no contact being made between the fingers 324 and 326 and the cassette.

The term "projection" is used herein in a comprehensive sense, i.e., to broadly refer to those systems wherein the visible images recorded on a sheet of material are reimaged for viewing purposes and is not restricted to only those systems in which the recorded visible images are projected onto a screen of one type or another.

Those familiar with the motion picture arts will readily appreciate the novel and unique advantages of the present invention. Each illustrated embodiment possesses certain features or advantages which may make its use preferable in specific applications. This invention may be practiced or embodied in still other ways without departing from the spirit or essential character thereof. Consequently, the preferred embodiments described herein are therefore illustrative and not restrictive, the scope of the invention being indicated by the appended claims and all variations which come within the meaning of the claims are intended to be embraced therein.

What is claimed is:

1. A photographic cassette adapted to be inserted as a unit into photographic equipment, comprising:
    a strip of photographic material;
    a container for initially storing a quantity of processing fluid and having a portion adapted to release such fluid in response to a predetermined hydraulic pressure developed in such fluid when pressure is applied to the exterior of said container;
    an applicator in communication with said portion of said container so that such processing fluid may be fed to said applicator from said container when such fluid is released;
    first means for applying a pressure to said container and expelling such fluid therefrom, said first means including a substantially rigid member initially positioned adjacent an extremity of said container spaced from said portion of said container and adapted to be subsequently displaced across said container toward said portion thereof and means for urging said rigid member against said container during said displacement of said rigid member; and
    second means for effecting relative motion between said applicator and said strip of photographic material whereby said applicator applies a coating of such fluid received from said container across a surface of said photographic material.

2. The cassette of claim 1 wherein said substantially rigid member is slidably mounted to the structure of said cassette.

3. The invention of claim 1 wherein said cassette additionally comprises a cover plate slidably mounted over said container and adapted to be engaged by an exteriorly mounted force applying member and displaced thereby from a first position wherein said cover plate protects said container from premature accidental rupture into a second position with respect to said container and said substantially rigid member extends from the side of said cover plate adjacent said container whereby said displacement of said rigid member across said container is automatically effected in the course of displacing said cover plate from its said first position to its said second position.

4. The invention of claim 3 wherein said rigid member is formed integrally with said cover plate.

5. A motion picture film-handling cassette comprising:
    a strip of photographic material coiled within said cassette;
    a rupturable pod for initially storing a quantity of processing fluid and having a weakened portion adapted to rupture in response to a predetermined hydraulic pressure developed in such fluid when pressure is applied to the exterior of said pod;
    an applicator in communication with said weakened portion of said pod so that such processing fluid may be fed to said applicator from said pod when said pod is ruptured;
    first means for rupturing said pod and expelling such fluid therefrom, said first means including a substantially rigid member initially mounted adjacent an extremity of said pod spaced from said weakened portion of said pad and adapted to be subsequently displaced across said pad toward said weakened portion thereof and means for urging said rigid member against said pod during said displacement of said rigid member; and
    second means for progressively advancing said strip of photographic material into operative relationship with said applicator.

6. A system for treating exposed photographic material with processing fluid comprising:
    a support surface;
    a rupturable pod for initially storing a quantity of processing fluid disposed adjacent said support surface, said pod having a weakened portion adapted to rupture in response to a predetermined hydraulic pressure developed in such fluid when force is applied to the exterior of said pod pressing said pod against said support surface;
    an applicator in communication with said weakened portion of said pod so that such processing fluid may be fed to said applicator from said pod when said pod is ruptured;

a substantially rigid member initially positioned adjacent an extremity of said pod spaced from said weakened portion of said pod;

means for effecting relative motion between said rigid member and said pod whereby said rigid member is displaced with respect to said pod from its initial position adjacent said extremity of said pod toward said weakened portion of said pod;

means for urging said rigid member against said pod to press said pod against said support surface while effecting said relative motion between said rigid member and said pod, whereby said pod is ruptured and such fluid expelled therefrom; and means for effecting relative motion between said applicator and such strip of photographic material whereby said applicator applies a coating of such fluid received from said pod across a surface of such photographic material.

7. A motion picture film-handling cassette comprising:

a housing;

a strip of photographic material;

a rupturable pod for initially storing a quantity of processing fluid and having a weakened portion adapted to rupture in response to a predetermined hydraulic pressure developed in such fluid when a force is applied to the exterior of said pod;

means for mounting said pod including a recess in an exterior face of said housing formed at least in part by a support surface against which said pod is positioned and a pair of opposed walls between which said pod is positioned with said weakened portion of said pod disposed in the vicinity of one pair of the ends of said opposed walls and an extremity of said pod spaced from said weakened portion thereof disposed in the vicinity of the other pair of the ends of said opposed walls;

a substantially rigid member slidably mounted between said opposed walls and initially positioned adjacent said extremity of said pod and adapted to be subsequently displaced against said pod toward said weakened portion thereof, said rigid member being further mounted to progressively press sections of said pod against said support surface to rupture said pod and expel such fluid therefrom during said displacement of said rigid member;

an applicator in communication with said weakened portion of said pod so that such processing fluid may be fed to said applicator from said pod when said pod is ruptured; and means for effecting relative motion between said applicator and said strip of photographic material whereby said applicator applies a coating of such fluid received from said pod across a surface of said photographic material.

8. The invention of claim 1 wherein said cassette additionally comprises a cover plate slidably mounted over said pod and adapted to be engaged by an externally mounted force applying member and displaced thereby from a first position wherein said cover plate protects said pod from premature accidental rupture into a second position with respect to said pod and said substantially rigid member extends from the side of said cover plate adjacent said pod whereby said displacement of said rigid member across said pod is automatically effected in the course of displacing said cover plate from its said first position to its said second position.

9. The cassette of claim 7 wherein said rigid member comprises a relatively narrow strip of material.

10. A cassette adapted to be inserted as a unit into photographic equipment, comprising:

a substantially enclosed housing;

a strip of photographic material within said housing;

a container for initially storing a quantity of processing fluid and having a portion adapted to release such fluid in response to a predetermined hydraulic pressure developed in such fluid when pressure is applied to the exterior of said container, said container being positioned against a section of the outside face of said housing;

an applicator in communication with said portion of said container so that such processing fluid may be fed to said applicator from said container when such fluid is released;

means for initially protecting said container and subsequently exerting a pressure against said container to release such fluid therefrom including a flexible cover overlying said container and means for connecting said cover to said housing whereby said cover will deflect inwardly toward said container to progressively exert a force across said container from an extremity of said container spaced from said portion thereof toward said portion responsive to relative motion being effected between an externally mounted force applying member in contact with the outside face of said cover and said cover; and means for effecting relative motion between said applicator and such strip of photographic material whereby said applicator applies a coating of such fluid received from said container across a surface of said photographic material.

11. The cassette of claim 10 wherein said cover is connected to said housing in a manner facilitating easy removal therefrom, whereby said relative motion may first be effected between said cassette and said externally mounted force applying member by movement of either said cassette or said externally mounted force-applying member in a fixed path to expel such fluid from said container, said cover may be readily removed from said cassette and subsequent relative motion can be effected between said externally mounted force applying member and said cassette along said fixed path free from any contact therebetween.

12. The cassette of claim 10 wherein said connecting means includes a plurality of legs configured to facilitate the displacement of said cover toward said container to exert a pressure on said container under the force exerted on said cover by said externally mounted force-applying member.

13. A cassette adapted to be inserted as a unit into photographic equipment, comprising:

a substantially enclosed housing;

a strip of photographic material within said housing;

a rupturable pod for initially storing a quantity of processing fluid and having a weakened portion adapted to rupture and release such fluid in response to a predetermined hydraulic pressure developed in such fluid when pressure is applied to the exterior of said pod, said pod being positioned against a section of the outside face of said housing;

an applicator;

means for feeding such fluid to said applicator when it is released from said pod;

means for protecting said pod and rupturing said pod including a cover overlying said pod and means for connecting said cover to said housing, said connecting means including a plurality of legs configured to facilitate the displacement of said cover toward said pod to effect the rupturing of said pod and the expelling of such fluid therefrom responsive to relative motion being effected between an externally mounted force applying member and said cover in a direction from the section of said cover positioned adjacent an extremity of said pod spaced from said weakened portion of said pod toward a section of said cover positioned adjacent said weakened portion of said pod; and means for effecting relative motion between said applicator and said strip of photographic material whereby said applicator applies a coating of such fluid received from said pod across a surface of said photographic material.

14. A motion picture film-handling system comprising:

a cassette including:

a strip of photographic material coiled within said cassette;

a rupturable pod for initially storing a quantity of processing fluid and having a weakened portion adapted to rupture in response to a predetermined hydraulic pressure developed in such fluid when a force is applied to the exterior of said pod;

an applicator in communication with said weakened portion of said pod so that such processing fluid may be fed to said applicator from said pod when said pod is ruptured;

first means for rupturing said pod and expelling such fluid therefrom, said first means including a substantially rigid member initially positioned adjacent an extremity of said pod spaced from said weakened portion of said pod and adapted to be subsequently displaced across said pod toward said weakened portion thereof; and second means for progressively transporting said strip of photographic material into operative relationship with said applicator; and a processing unit including:
  means for receiving said cassette;
  means for engaging said rigid member and for displacing said rigid member within said cassette across said pod; and
  drive means adapted to engage said second means, whereby said pod may be ruptured and said strip of photographic material transported in operative relationship to said applicator to form a coating of such fluid along said strip of photographic material.

15. Apparatus for processing a strip of exposed photographic material contained in a film-handling cassette, such cassette including a rupturable pod in which processing fluid is initially stored, such rupturable pod having a weakened portion adapted to rupture when such fluid stored therein is subjected to a predetermined pressure responsive to a compressive force being exerted against such pod, an applicator, means for feeding such fluid to such applicator when such weakened portion of such pod is ruptured and means adapted to be driven be external drive means for progressively advancing such strip of exposed photographic material across such applicator, comprising:
  means for receiving such cassette;
  an ejection spring acting against such cassette and mounted to be automatically loaded as such cassette is inserted into said receiving means;
  means for releasably locking such cassette in position against the force exerted thereon by said ejection spring when such cassette is fully inserted into said receiving means;
  means for progressively exerting a compressive force across such pod in a direction toward such weakened portion thereof, whereby such pod is ruptured and such fluid is expelled therefrom and fed to such applicator; and
  means for selectively driving such advancing means of such cassette whereby such applicator applies a coating of such fluid along the length of such strip of exposed photographic material.

16. Apparatus useful in processing a strip of exposed photographic material coiled in a film handling cassette, such cassette including a substantially flat rupturable pod for initially storing a quantity of processing fluid and having a weakened portion adapted to rupture in response to a predetermined hydraulic pressure developed in such fluid when a pressure is applied to the exterior of such pod and means for rupturing such pod and expelling such fluid therefrom including a substantially rigid member initially positioned adjacent an extremity of such pod spaced from such weakened portion of such pod and mounted on such cassette for displacement along a substantially straight line across such pod toward such weakened portion thereof, comprising:
  first means for receiving such cassette; and
  second means for engaging such rigid member and displacing such rigid member along such substantially straight line across such pod.

17. Apparatus useful in processing a strip of exposed photographic material coiled in a film-handling cassette, such cassette including a rupturable pod for initially storing a quantity of processing fluid and having a weakened portion adapted to rupture in response to a predetermined hydraulic pressure developed in such fluid when a pressure is applied to the exterior of such pod and means for rupturing such pod and expelling such fluid therefrom including a substantially rigid member initially positioned adjacent an extremity of such pod spaced from such weakened portion of such pod and adapted to be subsequently displaced across such pod toward such weakened portion thereof, comprising:
  first means for receiving such cassette; and
  second means for engaging such rigid member and displacing such rigid member across such pod, said second means being fixedly positioned within said apparatus and configured to automatically engage and displace such rigid member in the process of inserting such cassette into said apparatus.

18. Apparatus useful in processing a strip of exposed photographic material coiled in a film-handling cassette, such cassette including a rupturable pod for initially storing a quantity of processing fluid and having a weakened portion adapted to rupture in response to a predetermined hydraulic pressure developed in such fluid when a pressure is applied to the exterior of such pod, latch engaging means, and means for rupturing such pod and expelling such fluid therefrom including a substantially rigid member initially positioned adjacent an extremity of such pod spaced from such weakened portion of such pod and adapted to be subsequently displaced across such pod toward such weakened portion thereof, comprising:
  first means for receiving such cassette;
  second means for engaging such rigid member and displacing such rigid member across such pod; and
  means for releasably locking such cassette in said apparatus, said locking means including a latch positioned to engage such latch engaging means of such cassette when such cassette is fully inserted into said first means.

19. The apparatus of claim 18 additionally comprising means for selectively ejecting such cassette from said first means.

20. The apparatus of claim 19 wherein such ejection means comprises a spring positioned to automatically be compressed by such cassette as such cassette is inserted into said first means.

21. The apparatus of claim 19 wherein said ejection means additionally comprises means for selectively removing said latch from such latch-engaging means.

22. Apparatus for processing a strip of photographic material contained in a film-handling cassette, such cassette including a container in which processing fluid is initially stored, such container having a portion adapted to release such fluid when such fluid stored therein is subjected to a predetermined pressure responsive to a force-applying member being pressed against such container, an applicator, means for feeding such fluid to such applicator when such fluid is released from such container and means adapted to be driven by external drive means for progressively advancing such strip of exposed photographic material across such applicator, comprising:
  means for receiving such cassette;
  means for automatically effecting the release of such fluid from such container in the process of inserting such cassette into said apparatus including a force-applying member displaceably mounted to initially engage an extremity of such container spaced from such portion thereof as such cassette is partially inserted into said receiving means and when said force-applying member is in an initial position, to automatically exert a substantial force progressively across such container toward said portion thereof as the insertion process of such cassette into said receiving means is completed whereby such fluid is expelled therefrom and to automatically be displaced into another position wherein it exerts relatively little force against such container during the ejection of such cassette from such receiving means;

means for selectively driving such advancing means of such cassette whereby such applicator applies a coating of such fluid along the length of such strip of exposed photographic material; and means for selectively ejecting such cassette from said apparatus.

23. The apparatus of claim 22 wherein such cassette additionally includes means for engaging a latch and said apparatus additionally comprises means for releasably locking such cassette in said apparatus, said locking means including a latch positioned to engage such latch-engaging means of such cassette when such cassette is fully inserted into said receiving means.

24. The apparatus of claim 22 wherein said force-applying member comprises a roller.

25. The apparatus of claim 24 wherein said roller is mounted on a shaft passing through its axis of rotation and said fluid-releasing means additionally includes means for supporting said shaft including at least one guide track angularly disposed with respect to the plane in which such cassette is inserted into said receiving means, whereby the force exerted on said roller by such cassette during the process of inserting such cassette into said receiving means tends to displace said shaft along said guide track to a position wherein said roller is in its closest relationship with respect to such cassette while the force exerted by such cassette on said roller during the ejection of such cassette from said receiving means tends to displace said shaft along said guide tracks in a direction away from such cassette.

26. The apparatus of claim 25 additionally comprising a second roller disposed on the opposite side of such cassette from said first-mentioned roller when such cassette is disposed in said receiving means to engage such cassette and support such cassette against the force exerted thereon by said first-mentioned roller.

27. The apparatus of claim 26 wherein said ejection means comprises a spring positioned to be automatically loaded as such cassette is inserted into said receiving means, the force of said loaded spring tending to eject such cassette from said receiving means.

28. The apparatus of claim 24 wherein said roller is mounted on a shaft passing through its axis of rotation and said fluid-releasing means additionally includes means for displacably supporting said shaft including at least one guide track having a first section canted downwardly and inwardly with respect to the path with which such cassette is inserted into said receiving means and a second section extending downwardly from said first section in substantial parallel alignment with said path, whereby said shaft is positioned in said section section of said guide track to firmly press said roller against such container as such cassette is inserted into said receiving means and is adapted to be displaced into said first section of said guide track as such cassette is ejected from said receiving means.

29. Apparatus for processing a strip of photographic material contained in a film-handling cassette, such cassette including a container in which processing fluid is initially stored, such container having a portion adapted to release such fluid when such fluid stored therein is subjected to a predetermined pressure responsive to a force applying member being pressed against such container, an applicator, means for feeding such fluid to such applicator when such fluid is released from such container and means adapted to be driven by external drive means for progressively advancing such strip of exposed photographic material across such applicator, comprising:

means for receiving such cassette;

means for automatically expelling such fluid from such container in the process of inserting such cassette into said receiving means including a force-applying member pivotably mounted within said apparatus for selective displacement from a first position, wherein a portion thereof is disposed in the path of such container as such cassette is inserted into said receiving means to initially engage and exert a force against an extremity of such container spaced from such portion thereof and to then progressively exert a force across such container toward such portion thereof as the insertion of such cassette into said receiving means is completed, into a section position wherein such cassette may be ejected from or inserted into said receiving means free from contact with said force-applying member and means for selectively reversably displacing said force-applying member between its said first position and its said second position;

means for selectively driving such advancing means of such cassette whereby such applicator applies a coating of such fluid along the length of such strip of photographic material; and means for selectively ejecting such cassette from said apparatus.

30. The apparatus of claim 29 additionally comprising a support member disposed on the opposite side of such cassette from said force-applying member when such cassette is disposed in said receiving means and said force-applying member is disposed in its said first position to engage such cassette and support such cassette against the force exerted thereon by said force-applying member.

31. The apparatus of claim 30 wherein said support member comprises a roller.

32. The apparatus of claim 29 wherein such cassette additionally includes means for engaging a latch and said apparatus additionally comprising means for releasably locking such cassette in said apparatus, said locking means including a latch positioned to engage such latch-engaging means of such cassette when such cassette is fully inserted into said receiving means.

33. The apparatus of claim 32 wherein said ejection means comprises a spring positioned to be automatically loaded as such cassette is inserted into said receiving means, the force of said loaded spring tending to eject such cassette from said receiving means.

34. A motion picture film-handling cassette comprising;
a housing;
an elongated strip of photographic material stored within said housing;
a collapsible container enclosing a quantity of processing fluid, said container adapted to release such fluid responsive to a predetermined hydraulic pressure being developed in such fluid when a force-applying member causes a force to be exerted against the outside face of a wall of said container;
a force-applying member mounted within said housing for movement from a first position into a second position under the influence of actuating means mounted externally of said cassette, said force-applying member effecting a force against said container wall sufficient to develop such predetermined pressure within such fluid during such displacement;
means for expressing such fluid onto an adjacent section of said strip of photographic material;
means for feeding such fluid to said fluid-expressing means after it has been released from said container; and
means for effecting relative motion between said fluid-expressing means and said strip of photographic material whereby a coating of such fluid is progressively applied to the entire length of said strip of photographic material.

35. Apparatus for processing a strip of exposed photographic material contained in a compact multipurpose motion picture film-handling cassette, such cassette including an enclosed opaque housing; an elongated strip of photographic material stored within such housing; a collapsible container enclosing a quantity of processing fluid, such container adapted to release such fluid responsive to a predetermined hydraulic pressure being developed therein when a force applying member causes a force to be exerted against the outside face of a wall of such container; a force-applying member mounted within said housing for movement from a first position into a second position under the influence of actuator means mounted exteriorly of said cassette, such force applying member adapted to effect a force against such container wall sufficient to develop such predetermined pressure within such fluid during such displacement thereof; means for expressing such fluid onto an adjacent section of such strip of photographic material; means for feeding such fluid to such fluid-expressing means after it has been released from such container; means for progressively advancing such strip of photographic material across such fluid expressing means adapted to be driven by drive means mounted exteriorly of such cassette; comprising:

means for receiving such cassette;

actuating means mounted for engaging such force-applying member of such cassette and displacing such member from its such first position into its such second position; and drive means for engaging such means for advancing such strip of photographic material within such cassette and for selectively driving such advancing means, whereby such fluid may be expelled from such container and progressively applied to the entire length of such strip of photographic material.

* * * * *